United States Patent [19]
Selstad

[11] Patent Number: 5,842,439
[45] Date of Patent: Dec. 1, 1998

[54] REPTILE CAGE

[76] Inventor: Scott T. Selstad, 7453 Deering Ave., Canoga Park, Calif. 91303

[21] Appl. No.: 872,008

[22] Filed: Jun. 9, 1997

[51] Int. Cl.⁶ ...................................................... A01K 1/00
[52] U.S. Cl. ............................................ 119/481; 119/452
[58] Field of Search ..................................... 119/452, 453, 119/472, 473, 475, 480, 481, 246, 265, 266, 267, 458; 220/4.27; 206/509

[56] References Cited

U.S. PATENT DOCUMENTS

| | | | |
|---|---|---|---|
| 161,829 | 4/1875 | Sherer | 220/524 |
| 3,376,046 | 4/1968 | Kivett et al. | 280/33.998 |
| 3,584,605 | 6/1971 | Schwartz | 119/37 |
| 3,698,360 | 10/1972 | Rubricius | 119/458 |
| 3,754,676 | 8/1973 | Box | 220/31 S |
| 3,786,781 | 1/1974 | Poulsen . | |
| 4,844,016 | 7/1989 | Filosa | 119/19 |
| 5,271,515 | 12/1993 | Berkheimer et al. | 220/4.27 |
| 5,699,925 | 12/1997 | Petruzzi | 220/4.27 |
| 5,713,304 | 2/1998 | De Vosjoli et al. | 119/266 |

*Primary Examiner*—Robert P. Swiatek
*Assistant Examiner*—James S. Bergin
*Attorney, Agent, or Firm*—Jack C. Munro

[57] ABSTRACT

The subject invention is a reptile cage made of a sheet material and forming a rigid integral enclosure having a back wall and a front wall which are interconnected with side walls, as well as a top wall and a bottom wall which are also interconnected with the same side walls. An access door composed of a pair of sliding glass panels is mounted in a track mounted within the front wall. The top wall has an elongated ridge. The bottom wall has an elongated groove. The ridge of one cage is to matingly connect with the longitudinal groove of another cage to achieve an interlocking stacking relationship between cages. Mounted within the top wall is a bucket recess designed to receive a light source with this light source to be totally confined beneath the plane of the top wall. The front wall also includes a ventilation panel which can be opened and closed by means of one of the sliding panels of the access door.

2 Claims, 4 Drawing Sheets

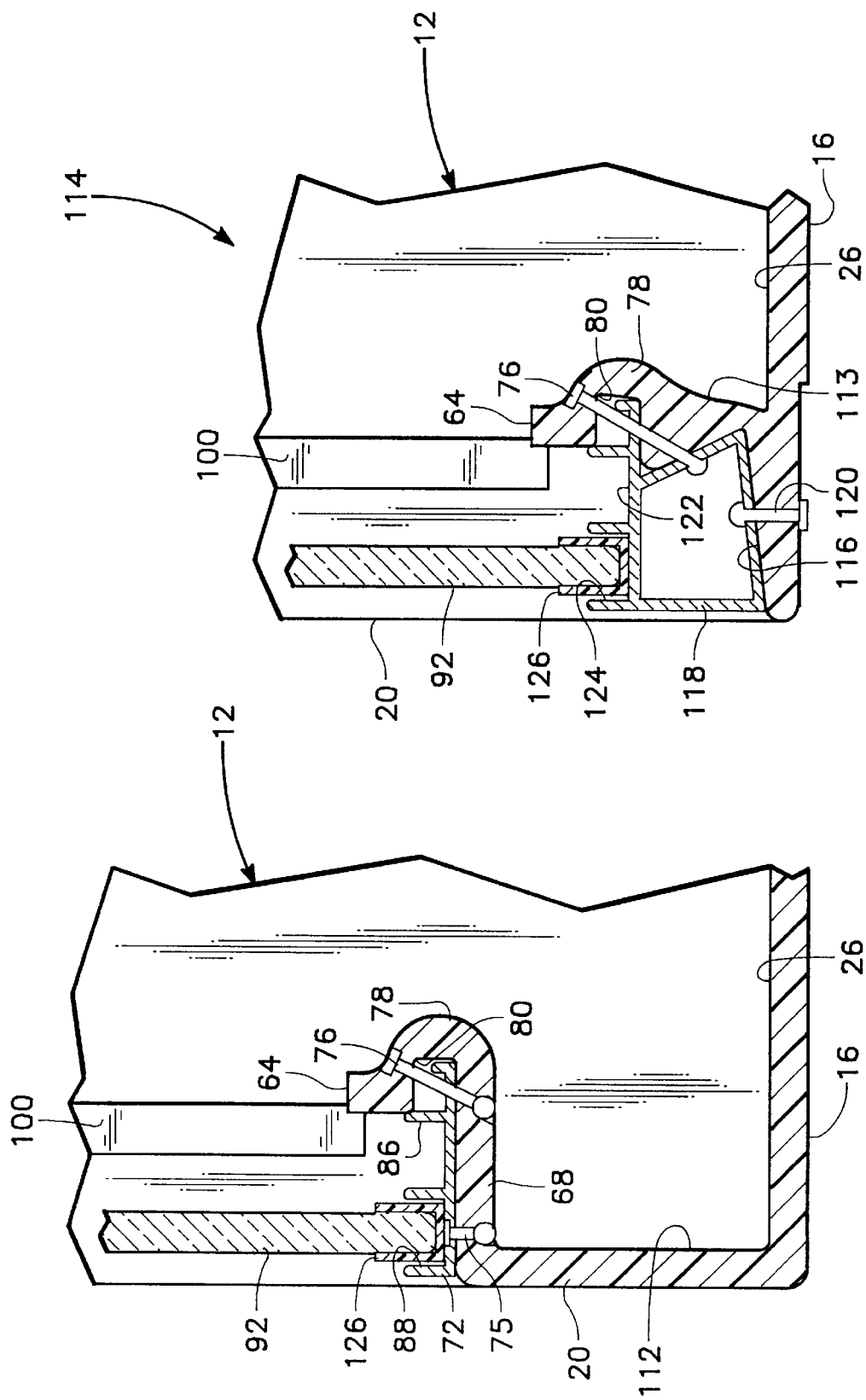

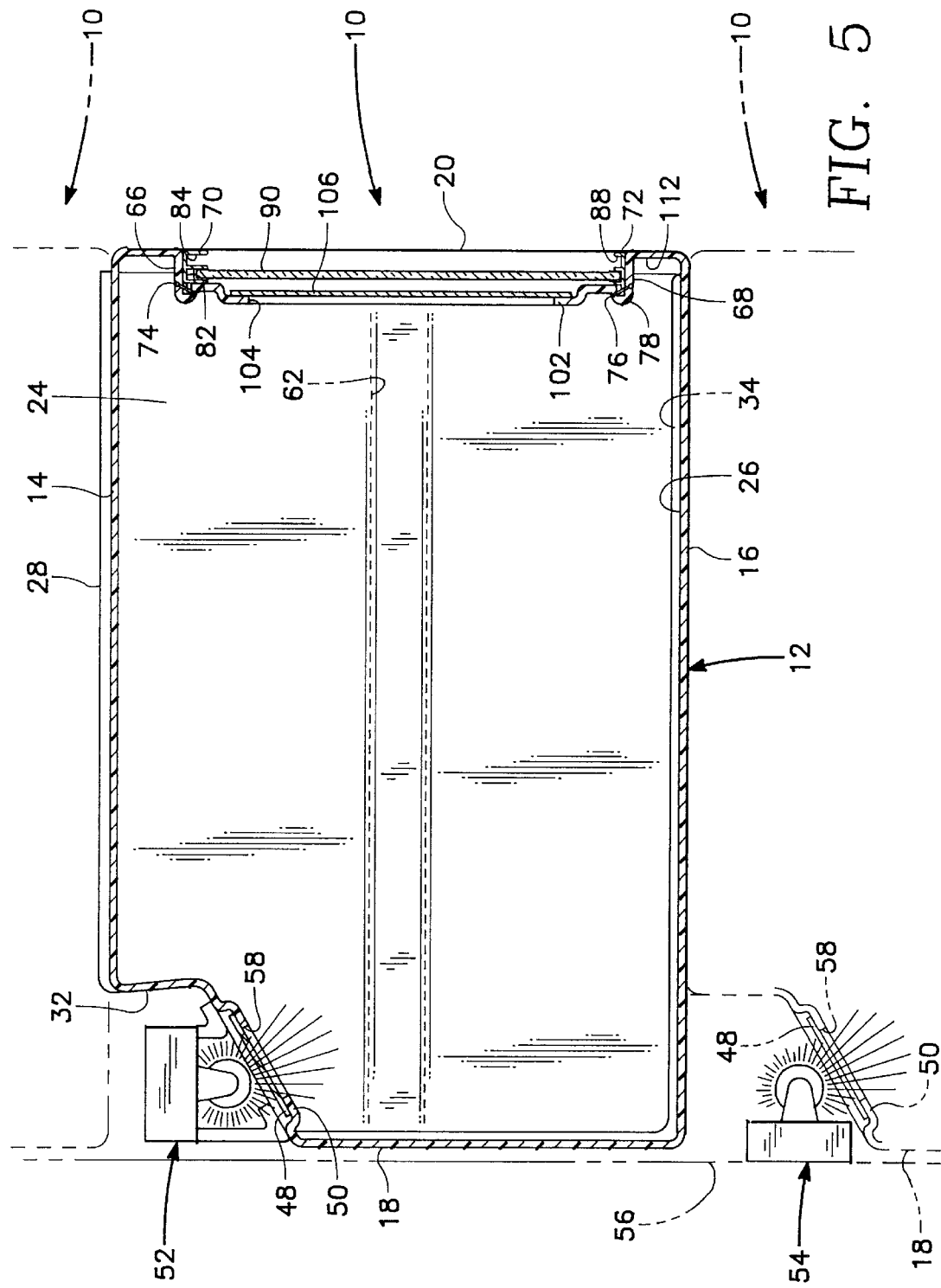

5,842,439

REPTILE CAGE

BACKGROUND OF THE INVENTION

1. Field of the Invention

The field of this invention relates to animal cages and more particularly to a cage that is designed to be used specifically in conjunction with reptiles.

2. Description of the Prior Art

Animal cages for confining wild animals in a domestic environment have long been known. Besides cages that are designed for rabbits, hamsters and other types of animals, there also are cages designed to be used in conjunction with reptiles such as snakes and lizards. In the past, however, little effort has been expended in the designing of cages specifically for reptiles. Reptiles have unique needs. Reptiles not only require ventilation but also require heat. The cages of the prior art have not been designed to include a convenient heat source. Also, it is desirable to control the ventilation to some extent so that it can be readily adjusted. The cages of the prior art have not been designed with a variable ventilation feature. Also, the cages of the prior art have not been constructed in a manner to facilitate cleaning. Different parts of the cage are to be readily removable, cleanable and replaceable. Again, cages of the prior art have not been so designed.

Also, another disadvantage of prior art cages is that such have not been durable and light in weight. Also, cages of the prior art have not been easily stackable nor easy to heat. And lastly, cages of the prior art have not been manufactured at an affordable price for the average consumer.

SUMMARY OF THE INVENTION

The primary objectives of the present invention are to construct a reptile cage that is durable, light in weight, stackable, easy to heat, easy to clean, easy to light and is available to the user at an affordable price.

The cage of the present invention is constructed of a rigid enclosure in which the walls are basically of a sheet material configuration. The rigid enclosure has a back wall and a front wall, as well as a top wall and a bottom wall. A right side wall and a left side wall interconnect the front wall and the back wall, as well as the top wall and the bottom wall. The front wall includes an access opening within which is mounted a pair of slidable transparent door panels. Also mounted within the front wall is a ventilation screen that can be readily opened and closed by the location of one of these door panels. The top wall includes a bucket recess, and within that bucket recess there is located a lighting source. The bottom surface of the bucket recess is covered by a screen. The door panels are mounted in a track with this track being capable of either being mounted on a horizontal ledge of the front wall or the track being mounted within a large cutout formed within the front wall. The back wall includes a separate cutout area having an inclined surface relative to the plane of the top. This inside surface is to include openings with these openings to be covered by screen. Through this inclined surface is to be conducted ventilation, as well as heat from a light source as an option. The exterior surface of the top wall includes at least one elongated ridge with the exterior surface of the bottom wall including at least one elongated recess. The elongated ridge of one cage is to matingly connect with an elongated recess of another cage to achieve an interlocking stacking relationship between cages.

BRIEF DESCRIPTION OF THE DRAWINGS

FIG. 3 is a cross-sectional view through a portion of the reptile cage of the present invention taken along line 3—3 of FIG. 1 showing the first embodiment of track that is used to connect with the door panels of the cage;

FIG. 4 is a view similar to FIG. 3 but of a second embodiment of the track that is used with the door panels of the access door; and FIG. 5 is a cross-sectional view through the reptile cage of the present invention taken along line 5—5 of FIG. 1 depicting the stacking relationship between a plurality of cages as well as showing two ways that a heat source can be mounted in conjunction with the cage.

DETAILED DESCRIPTION OF THE PREFERRED EMBODIMENT

Figure 1:
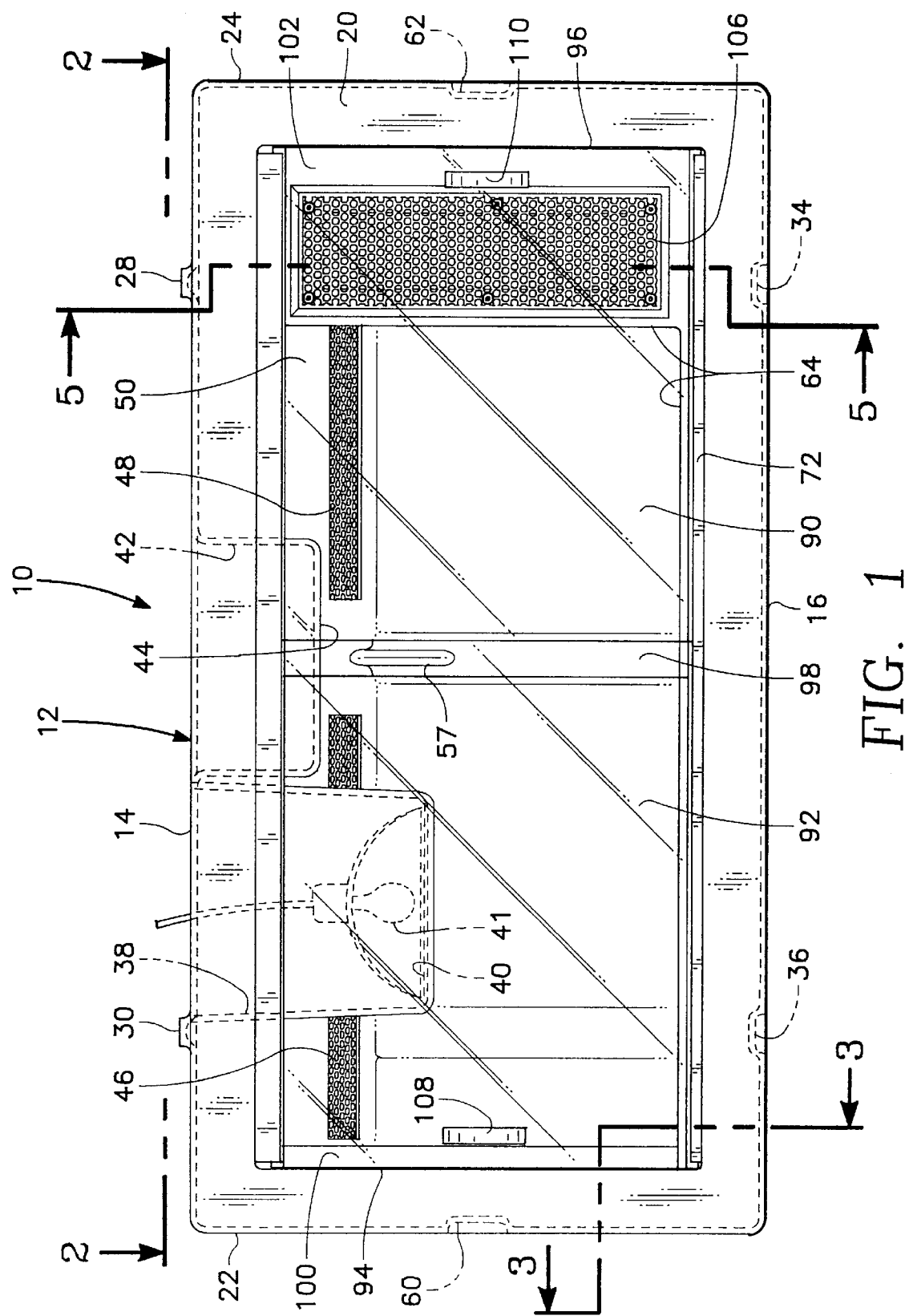
FIG. 1 is a front view of the reptile cage constructed in accordance with this invention.
Figure 2:
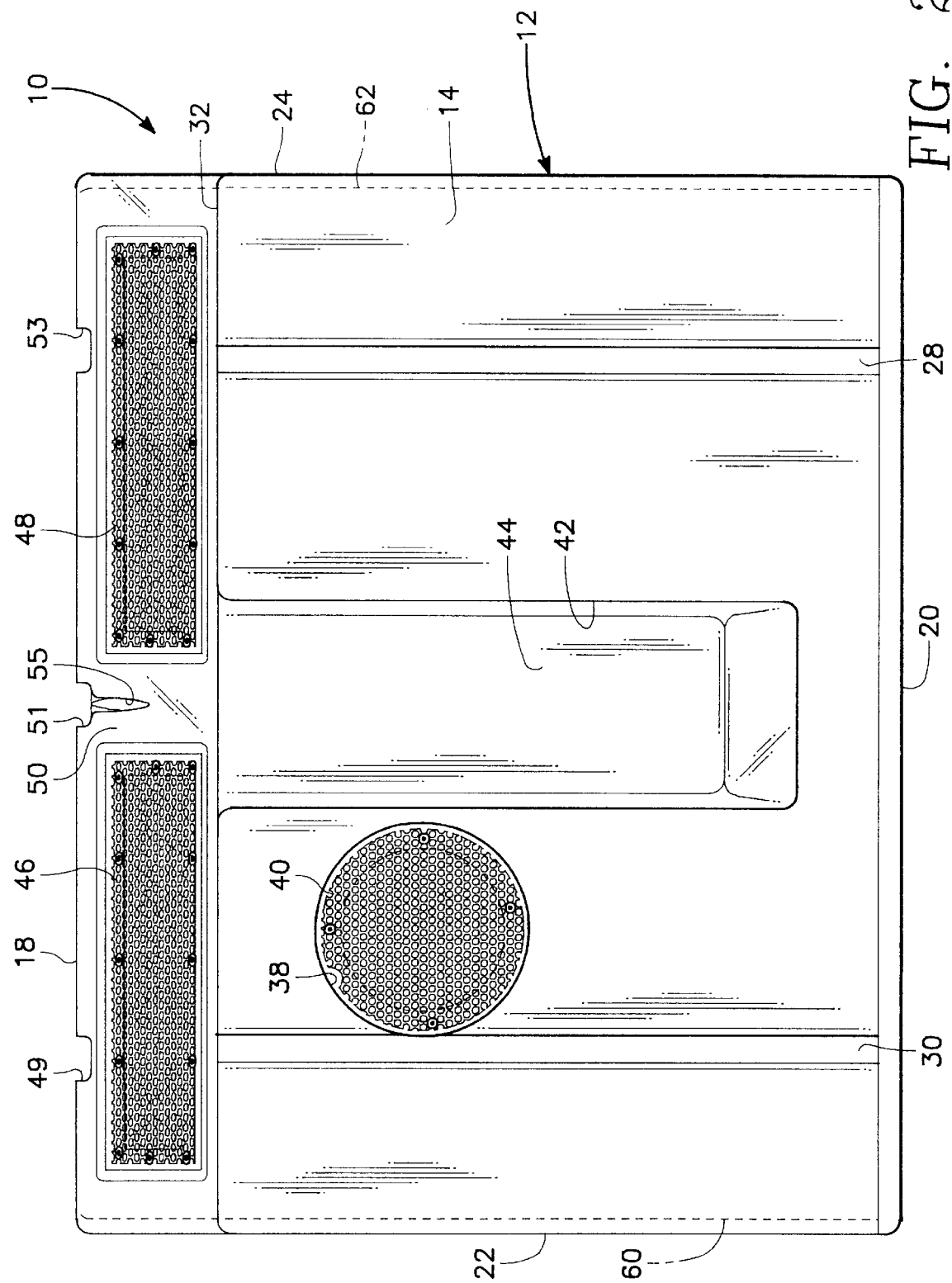
FIG. 2 is a top plan view of the reptile cage of the present invention taken along line 2—2 of FIG. 1.

Referring particularly to the drawings, there is shown the reptile cage 10 of this invention. The cage 10 is composed of an enclosure 12 which would normally be constructed of a blow molded plastic. The enclosure 12 has a top wall 14, a bottom wall 16, a back wall 18 and a front wall 20. A right side wall 22 and a left side wall 24 connect together the top wall 14 and bottom wall 16 and the back wall 18 and the front wall 20. Basically, each of the walls 14 to 24 is of a sheet material configuration and is planer. A typical thickness for each of the walls 14 to 24 would be approximately one-quarter of an inch. The walls 14 to 24 combine to form an internal chamber 26.

Exteriorly mounted on the top wall 14 and protruding outwardly therefrom is a pair of longitudinal ridges 28 and 30 which can be referred to as the first hiatus means. Each of the ridges 28 and 30 is of the same length and extends from the front wall 20 to a cutout area 32 located directly adjacent the back wall 18. The longitudinal ridge 28 is located nearest the left side wall 24 with the longitudinal ridge 30 being located nearest the right side wall 22. Formed within the bottom wall 16 is a pair of longitudinal grooves 34 and 36 which can be referred to as a second hiatus means. When a separate reptile cage 10 is placed in a stacked relationship with another reptile cage 10 with their respective walls 14 to 24 being aligned, the first hiatus means of one cage 10 interlocks with a second hiatus means of a second cage 10 which comprises the longitudinal ridge 28 to be matingly located within the longitudinal groove 34 and the longitudinal ridge 30 to be matingly located within the longitudinal groove 36. This type of interlocking connecting arrangement will prevent the uppermost cage 10 from sliding off of the lowermost cage 10. This type of interlocking relationship will permit the cages 10 to be stacked four to six high and possibly even higher.

Also formed within the top wall 14 is a bucket recess 38. The bucket recess 38 extends within the internal chamber 26. The bottom of the bucket recess 38 is open with the exception of being covered by a screen 40. It is the function of the screen 40 to prevent the reptile(s) (not shown) from escaping from the internal chamber 26. The bucket recess 38 is intended to accommodate an incandescent or ultraviolet light source 41 (not shown). It will be the purpose of the light source 41 to provide heat, as well as light within the internal chamber 26. It is to be noted that the light source 41 will be located interiorly of the top wall 14 thereby not interfering with the stacked relationship of the cages 10.

Also formed within the top wall 14 is an elongated, enlarged recess 42. This recess 42 is shown as connecting with the cutout area 32 and extending to an area substantially directly adjacent the front wall 20. The purpose of the elongated enlarged recess 42 is that, if the user desires, the bottom surface 44 of the elongated enlarged recess 42 could be cut out and then could be covered by a screen (not shown). This screened opening would provide additional ventilation into the internal chamber, as well as facilitate an additional light source, if such would be desired.

However, the principal ventilation and light source are provided by screens 46 and 48 formed within the inclined surface 50 of the cutout area 32. The inclined surface 50 is located at an angle of approximately thirty degrees relative to the plane of the top wall 14. It is also to be understood that the top wall 14 is substantially parallel to the bottom wall 16 with the side walls 22 and 24 also being parallel as well as the front wall 20 being parallel with the back wall 18. The screens 46 and 48, besides facilitating ventilation to internal chamber 26, could be used to conduct light into the internal chamber 26. The light source 52, which would typically be fluorescent, could be mounted on the inclined surface 50 as shown in FIG. 5. A light source 54, essentially identical to light source 52, could be mounted on a vertical wall 56 with the cage 10 abutted against the wall 56. The light from the light source 52 or 54 is to be conducted through the screen 48 and then through hole 58 formed within the inclined surface 50. Because of the inclination of the inclined surface 50, the light will tend to shine and completely cover the entire area of the bottom wall 16. The reason for the inclination of the inclined surface 50 is so that the light from the light source 52 or 54 will substantially completely cover the bottom wall 16. It is to be understood, of course, that the light source 52 and 54 will, at times, be turned off and at other times will be turned on. Although there is only one hole 58 shown which connects with the screen 48, it is to be understood that there will be a separate hole (not shown) for the screen 46.

The right side wall 22 includes an elongated groove 60 with a similar such elongated groove 62 being formed within the left side wall 24. The grooves 60 and 62 are for strengthening purposes only and extend in a substantially horizontal direction from the back wall 18 to the front wall 20.

The front wall 20 includes an enlarged access opening 64. The access opening 64 defines an upper ledge 66 which is located directly adjacent the top wall 14 and a lower ledge 68 which is located directly adjacent the bottom wall 16. Mounted on the upper ledge 66 is an upper door track 70. A lower door track 72 is mounted on the lower ledge 68. The upper door track 70 is fixedly secured in position on the upper ledge 66 by means of a plurality of rivets 74. The lower door track 72 is similarly fixedly secured in position on the lower ledge 68 by means of a plurality of spaced apart rivets 75 and 76. The lower ledge 68 includes a curved end 78 which forms an internal elongated pocket 80. The forward end of the lower door track 72 is located within the pocket 80. The rivets 76 are passed through the curved end 78, the forward end of the lower door track 72 and then is fixedly mounted within the lower ledge 68. The rivets 76 are mounted so that there is nothing protruding that could possibly cause injury to the reptile contained within the internal chamber 26 or the user handling the cage. In other words, each end of each rivet 76 is recessed within the curved end 78 and the lower ledge 68.

The upper door track 70 includes an inner track 82 and an outer track 84. In a similar manner, the lower door track 72 also includes an inner track 86 and an outer track 88. The rivets 75 connects with the outer track 88. It is to be understood that along the longitudinal length of the lower door track 72 there is a plurality of the rivets 75 and of the rivets 76 located in spaced-apart arrangements. A door panel 90 is mounted between the inner tracks 82 and 86 with a separate door panel 92 being mounted between the outer tracks 84 and 88. The door panels 90 and 92 are capable of slidably moving within their respective tracks. The width of each of the door panels 90 and 92 is equal and each is slightly greater than one-half of the width of the access opening 64. Each of the door panels 90 and 92 is to be transparent with normally glass being preferred. The door panel 92 is to abut against the right end 94 of the access opening 64 with the panel 90 abutting against the left end 96 of the access opening 64. With the panels 90 and 92 in this position, the panels 90 and 92 overlap at their opposite ends forming an overlapped section 98. This overlapping of the panels 90 and 92 is to prevent escape of the reptile through access opening 64 contained within the internal chamber 26. However, either door panel 90 or 92 can be slid to be located in juxtaposition with the other door panel providing access into the internal chamber 26 for purposes of cleaning, supplying food or water, or entry and removal of the reptile.

When the door panel 92 is in the position shown in FIG. 1 abutting against the right end 94, there is a flange 100 that is located directly against the inside surface of the door panel 93 thereby forming a seal in conjunction with the door panel 92 to prevent escape of any reptile contained within internal chamber 26. In a similar manner, there is a flange 102 mounted directly adjacent the inside surface of the panel 90. It is to be noted that the flanges 100 and 102 are purposefully misaligned from each other. The reason for this is that a relatively tight seal is to be formed in conjunction with each respective door panel 90 and 92. In order to achieve that tight seal, because the door panels 90 and 92 are located in a side-by-side relationship, the flanges 100 and 102 have to be misaligned in order to compensate for the offsetting of the door panels 90 and 92. The flange 102 is of a substantially large size and includes an enlarged hole 104. This enlarged hole 104 is covered by a screen 106. This permits the door panel 90 to be adjusted to expose the screen 106 to the ambient air which provides additional ventilation within the internal chamber 26. Also, the door panel 90 could be moved to be directly adjacent the left end 96 which will completely cover the screen 106 and thereby eliminate any ventilation through the screen 106. The use of the door panel 90 in conjunction with the screen 106 is deemed to be a matter of choice by the user.

The door panel 92 has formed therein a handle recess 108. A similar handle recess 110 is formed in the panel 90. The handle recesses 108 and 110 facilitate manual movement of the panels 90 and 92.

Referring particularly to FIG. 3 of the drawings, it can be observed that between the lower ledge 68 and the bottom 16 is formed an alcove 112. This alcove 112 is normally undesirable as it would tend to collect residue from the internal chamber 26 and would be difficult to clean. Referring particularly to FIG. 4, there is shown a modified form of cage 114 where the enclosure 12 is constructed differently to include a large cutout 116. Within the large cutout 116 is mounted a completely different configuration of lower track 118. This lower track 118 is not only secured in position by the rivets 76 but also by recessed rivets 120 which are mounted within the bottom wall 16. The result is the alcove 113 is substantially reduced in size from alcove 112 and almost essentially eliminated within the embodiment of FIG. 4.

The lower track 118 also includes the inner track 122 and outer track 124. The door panel 92 slides within the outer track 124 with the door panel 90 sliding within the inner track 122. In order to facilitate sliding movement of the door panels 90 and 92, the edges of the panels 90 and 92 are to be covered with a U-shaped plastic strip 126.

The cage of the present invention is by far the most durable and lightweight reptile cage that is available. The reptile cage 10 of the present invention is constructed of high-density polyethylene plastic which is the strongest, most impact resistant, food grade plastic available. High density polyethylene is completely chemically non-reactive and completely safe for use with animals. Substances such as uric acid, bleach, disinfectants and gasoline have absolutely no effect on high density polyethylene plastic. The cages 10 are molded from one single piece of plastic giving the cage exceptional structural integrity. The use of the bucket recess 38 allows the use of a conventional aluminum cupped light fixture while completely protecting the reptile from contact with a hot bulb. The bucket recess 38 is open at the top for easy drop-in installation and removal of the light fixture 52 or 54. The screen at the bottom of the bucket recess 38 allows for the penetration of the light into the internal chamber 26.

The back wall 18 includes a series of vertically oriented longitudinal grooves 49, 51 and 53. These grooves are evenly spaced apart. The purpose of the grooves 49, 51 and 53 are for the purpose of supplying strength to the back wall 18. The cutout 32 also includes an indentation 55 located between the screens 46 and 48. The indentation 55 produces a protuberance 57 which extends to within the internal chamber 26. The protuberance 57 is visually observable through the transparent panels 90 and 92.

What is claimed is:

1. A reptile cage comprising:

a rigid enclosure having a back wall and a front wall with a right side wall and a left side wall interconnecting said back wall and said front wall, said rigid enclosure also having a top wall and a bottom wall with said right side wall and said left side wall also interconnecting said top wall and said bottom wall, said top wall being generally flat forming a plane, an access door mounted within said front wall, said top wall having first hiatus means, said bottom wall having second hiatus means, said first hiatus means of one said cage adapted to matingly connect with a said second hiatus means of another said cage to achieve an interlocking stacking relationship between cages; and said back wall including a cutout area, said cutout area having an inclined surface which is inclined relative to said plane, said inclined surface including a screen, whereby said screen can be utilized to permit light to pass therethrough as well as ventilation.

2. A reptile cage comprising:

a rigid enclosure having a back wall and a front wall with a right side wall and a left side wall interconnecting said back wall and said front wall, said rigid enclosure also having a top wall and a bottom wall with said right side wall and said left side wall also interconnecting said top wall and said bottom wall, said top wall being generally flat forming a plane, said front wall includes an enlarged access opening, said track being mounted in said enlarged access opening, said enlarged access opening having a curved end, said track being secured by rivets to both said curved end and said bottom wall, an access door mounted within said front wall, said top wall having first hiatus means, said bottom wall having second hiatus means, said first hiatus means of one said cage adapted to matingly connect with a said second hiatus means of another said cage to achieve an interlocking stacking relationship between cages;

said access door comprising a pair of panels, said panels being mounted within a track, said panels being transparent, said panels being offsetly mounted within said track, said panels being slidably movable within said track, said track being mounted within said front wall.

\* \* \* \* \*